Oct. 30, 1962 P. WEIEN 3,060,493
MOLDING MACHINE
Filed Jan. 20, 1959 8 Sheets-Sheet 1

Fig. 1.

INVENTOR
*Paul Weien*
BY *Stevens, Davis, Miller & Mosher*
ATTORNEYS

Oct. 30, 1962 P. WEIEN 3,060,493
MOLDING MACHINE
Filed Jan. 20, 1959 8 Sheets-Sheet 3

INVENTOR
*Paul Weien*

BY *Stevens, Davis, Miller & Mosher*
ATTORNEYS

Oct. 30, 1962 P. WEIEN 3,060,493
MOLDING MACHINE
Filed Jan. 20, 1959 8 Sheets-Sheet 5

INVENTOR
*Paul Weien*
BY *Stevens, Davis, Miller & Mosher*
ATTORNEYS

Oct. 30, 1962 P. WEIEN 3,060,493
MOLDING MACHINE
Filed Jan. 20, 1959 8 Sheets-Sheet 7

INVENTOR
*Paul Weien*

BY *Stevens, Davis, Miller & Mosher*
ATTORNEYS

Oct. 30, 1962  P. WEIEN  3,060,493
MOLDING MACHINE
Filed Jan. 20, 1959  8 Sheets-Sheet 8

INVENTOR
*Paul Weien*

BY *Stevens, Davis, Miller & Mosher*
ATTORNEYS

United States Patent Office 3,060,493
Patented Oct. 30, 1962

3,060,493
MOLDING MACHINE
Paul Weien, Marietta, Pa., assignor of one-half to
Louis X. Garfunkel, New York, N.Y.
Filed Jan. 20, 1959, Ser. No. 787,999
13 Claims. (Cl. 17—32)

The present invention relates to a molding machine. More particularly the machine of the present invention is adapted to receive a quantity of material, such as ground meat, or other moldable material and to form patties therefrom of a predetermined shape and weight. The novel features of the present invention, as will appear hereinafter, permit the molding machine to operate in such a manner as to produce the shaped articles of food or other moldable material much more efficiently and much quicker than has been effected heretofore on machines designed for the same general purpose. Furthermore the machine of the present invention is designed in such a manner that the entire operating cycle can be performed without requiring direct contact at any time with the human operating element.

Briefly stated, the present invention involves a cylindrically shaped hopper rotatable on a vertical axis relative to a stationary and horizontal base plate. The base plate encloses the bottom of the hopper but has an opening therein. A stationary pitched blade positioned within the hopper above the base plate will direct the material in the hopper towards the opening in the base plate as the material is moved by frictional contact with the sides of the rotating hopper.

A horizontal turntable having a plurality of vertically-arranged cylindrical openings therein is rotatably mounted to one side of the base plate such that, as each cylindrical opening passes beneath the base plate it comes into registry with the opening in the base plate. (Although the openings in the turntable have been referred to above and will be described hereinafter as "cylindrical" it should be understood that the holes can be of any other desired and predetermined shape). A piston is slidably received within each cylindrical hole, and each piston is mounted on a piston rod which projects downwardly beneath the turntable. The pistons move up and down within the cylindrical holes by means of a cam track, against which the lower ends of the piston rods are resiliently urged. As the turntable rotates, the pistons will move in accordance with the configuration of the cam track; thus, when each cylindrical opening of the turntable is positioned directly below the opening in the base plate of the hopper, its corresponding piston is in its lowermost position such that the space between the top of the piston and the bottom of the hopper will permit the formation of a narrow cylindrical block (or patty) of material in this space. When the turntable moves to a position away from the base plate of the hopper, the piston will be moved upwardly such that its upper end will be level with the top of the turntable.

As the piston rods move from the upper cam track to the lower cam track in the direction of the opening in the base plate, these piston rods pass over an inclined cam segment which connects the two cam tracks. This interconnecting cam segment is adjustable with respect to the two cam tracks such that the pistons can be caused to commence their downward inclined movement towards the lower cam track at a later or earlier time as desired. Thus, if the machine is operating so as to produce relatively thin patties, it is desirable to advance the inclined cam segment so that the pistons start their downward movement at a later time; if, on the other hand, a thicker patty or cake is being produced by the machine, it is desirable to move the inclined cam segment away from the opening in the base plate so that the pistons will start their downward movement at an earlier time. In this way, the time cycle for filling the spaces above the pistons is variable. It can be stated as a general proposition, for patties of a relatively constant density, that the duration of the filling cycle will increase as the thickness of the patty increases. Stated differently, the adjustable nature of the inclined cam segment also permits a control of the density of the patty.

Another rotatable supporting member is positioned above and to one side of the turntable. The second rotatable support includes therein a plurality of reciprocating impaling elements which are also operated by cams. For example, the vertical rods upon which the impaling elements are mounted are urged upwardly against a circumferential cam track; the cam track is so shaped that the impaling elements are adapted to pass downwardly through perforations or apertures in the rotatable supporting member as the latter is rotated. Also, movement of these impaling elements through their respective holes is in synchronism with the rotation of the turntable. Thus, as the turntable moves a patty from beneath the fixed plate of the hopper and upwardly into a position which is level with the top of the turntable, an impaling element (or group of the same) on the second rotatable support is moved downwardly so as to impale this patty and slide the same from the turntable. The patty is maintained in position on the impaling element and is not released therefrom until some time subsequent. As the rotatable support continues to move, the impaling element is elevated thereafter and the impaling elements are withdrawn from the patty so as to permit the same to be dropped at some convenient location.

In the embodiment of the present invention, as shown in the drawings, the patties will be appropriately dropped onto a horizontal belt conveyor which may then, if desired, feed the patty into a pattern roll or again, if desired, through a scoring or transfer unit.

The pattern roll is positioned above the horizontal belt conveyor and is movable upwardly and downwardly relative to the belt. The outer surface of the pattern roll may be scored or knurled or may have any other predetermined configuration which it is desired to have imparted to the patties coming in contact with this roll. Also, the pattern roll is driven such that its peripheral speed is the same as that of the conveyor belt moving beneath it. If it is desired to change the shape of the (generally cylindrical) patty being fed to the pattern roll into an elongated oval, then the pattern roll is preferably one in which a plurality of circumferential grooves are provided; the patty, passing under this type of pattern roll is merely lengthened in the longitudinal direction. A pattern roll having knurled surfaces will increase the horizontal dimensions of the patty in both longitudinal and transverse directions.

The scoring or transfer unit, as the same will be described hereinafter in greater detail, includes upper and lower interacting rollers. The upper and lower rollers may be provided with intercalating or interdigitating disc-shaped knives which permit scoring of the patty on both its upper and lower surfaces. If desired, the lower roll of this device can be a smooth, solid roll in which case the patty is scored only on its upper surface; one advantage of this last variation is that the patties may be fed through this unit with papers adhering to the lower surfaces of the patties. Where the upper roll is elevated so that it is carried completely out of contact with the patty, the device functions merely as a transfer unit.

Thus, a principal object of the present invention is to provide a machine of the type referred to above which is entirely automatic in operation and which will permit the formation of molded products in a manner much more efficient and much quicker than has heretofore been effected in machines designed for the same general purpose.

Another object of the present invention is to provide a machine of the type described above where the feeding operation is effected through the interaction of a stationary pitch blade and a rotating hopper, wherein the material in the hopper is moved by frictional contact with the sides of the hopper and is directed towards an opening in the base by means of the stationary pitch blade.

Another object of the present invention is to provide a machine of the type described above wherein the duration of the filling cycle is adjustable with respect to the thickness of the patty produced.

Another object of the present invention is to provide a rotatable device which is movable in synchronism with the shaping or molding mechanism and which is capable of engaging and removing the molded product from the molding mechanism and depositing the product upon another device spaced from the molding mechanism.

Another object of the present invention is to provide a pattern roll which is positioned above a horizontal conveyor and driven at the same peripheral speed as the conveyor and which is adapted to increase the horizontal dimensions of the patties in the traverse and/or longitudinal directions.

Another object of the present invention is to provide a scoring and transfer unit which is capable of (a) scoring the upper and lower surfaces of the patties, or (b) the upper surface only of the patties, or, where the upper element is moved to an inoperative position, (c) acting solely as a transfer unit.

Another object of the present invention is to provide a machine of the type described above which is easily adjustable to provide preformed molded products of different predetermined sizes, shapes and weights.

Other and further objects and advantageous features of the present invention will hereinafter more fully appear in connection with a detailed description of the drawings wherein:

FIGURE 3 is a sectional view, on an enlarged scale, of the drive means for the molding machine;

Figure 1:
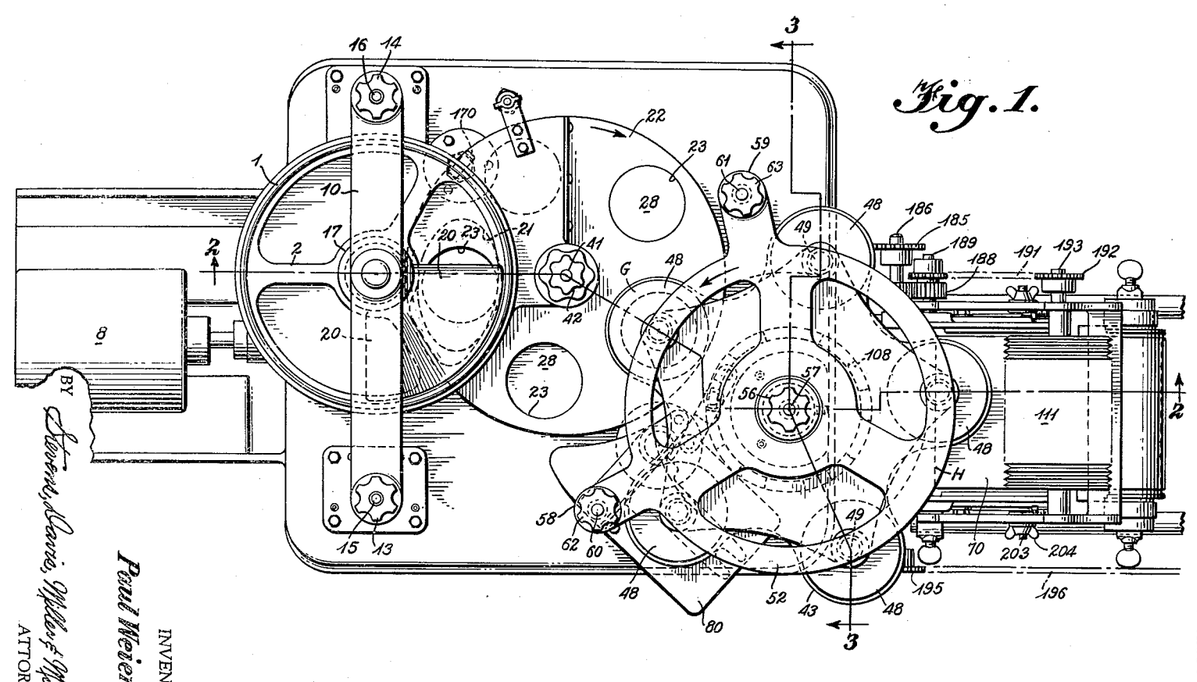
FIGURE 1 is a plan view of my novel molding machine.
Figure 2:
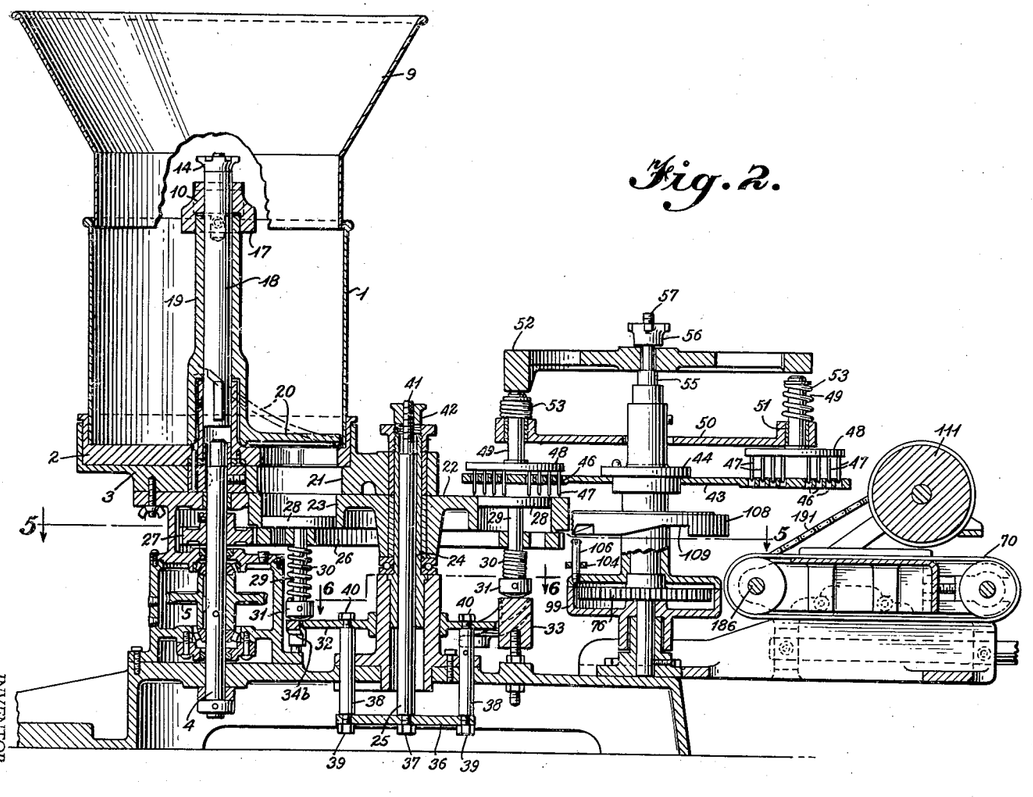
FIGURE 2 is a longitudinal sectional view taken along section line 2—2 of FIGURE 1.
Figure 3:
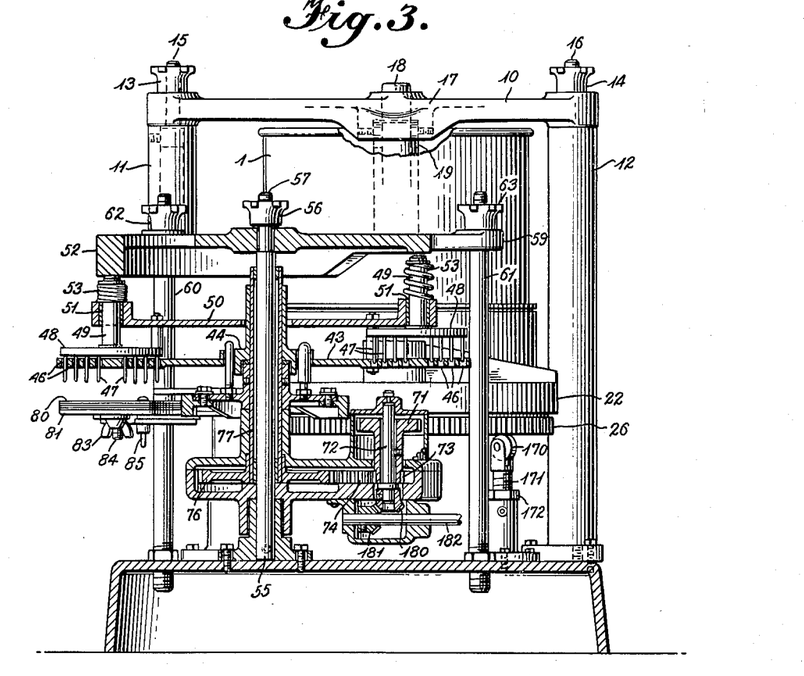
FIGURE 3 is a transverse sectional view taken along section line 3—3 of FIGURE 1, showing the impaling elements and the supporting means therefor.
Figure 4:
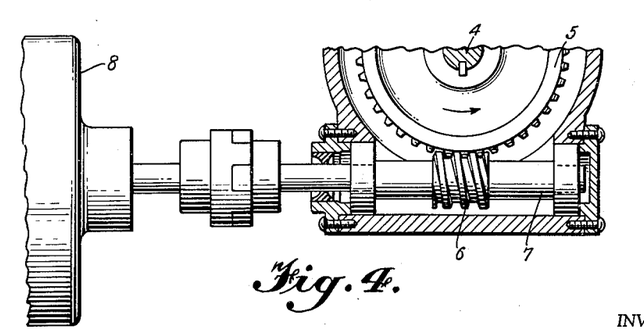

Referring to the drawings in detail, in FIGURES 1, 2 and 3 there is shown a rotatable cylindrical hopper 1 which is mounted on a rotatable spider 2 above a fixed base plate 3. The spider 2 is keyed to a vertical shaft 4 which, in turn, is keyed to a worm gear 5. From a consideration of FIGURES 1 and 2 it should be apparent that the spider 2 is provided with three spaced, radial arms projecting from the hub of the spider to the outer ring thereof. The space between each two arms of the spider will overlie the hole 21 in the base plate 3. As shown in FIGURE 4, the gear 5 is driven by a worm 6 mounted on a worm shaft 7 which is driven by an electric motor 8. Thus, the hopper 1 together with its spider-shaped base 2 is rotatable relative to the fixed base plate 3.

At the top of the rotatable hopper is a stationary conical hopper 9 which is supported on a horizontal bar 10 extending across the top of the rotatable cylindrical hopper 1. Suitable rectangular openings (not shown) are provided adjacent the bottom portion of the conical hopper 9 so as to engage the bar 10 and prevent rotation of the conical hopper. The ends of the bar 10 are secured to vertical posts 11 and 12 by means of nuts 13 and 14 which are received on threaded rods 15 and 16 passing through suitable holes at the end of the bar 10.

The bar 10 is provided with a central collar portion 17, through which projects an upper vertical extension 18 of the rotatable shaft 4. A stationary sleeve 19 surrounding the shaft 18 is secured at its upper end to the collar 17 of the bar 10. The lower end of the sleeve 19 is provided with a helically shaped blade 20, which is positioned in stationary fashion over a hole 21 provided in the stationary base plate 3. As best shown in FIGURE 1, the stationary blade 20 extends over about 90° of the area of the base plate 3, the upper or leading edge of the blade 20 being located on a line below the bar 10 and the lowermost or trailing edge of the blade 20 being located directly above and towards the rear of the hole 21 in the base plate 3. Thus, if material, such as ground meat, is placed in the rotating cylindrical hopper 1, frictional contact between this material and the hopper will cause the material to pass beneath the blade 20 and into the hole 21 in the base plate 3.

Located to the right of the hopper 1 and below the base plate 3 is a rotatable turntable 22, which is provided with a plurality (five) of vertical and cylindrically shaped holes, all of which are designated by the reference character 23. Turntable 22 is mounted for rotation on a sleeve 24 surrounding the vertical rod 25, the purpose of which will be more fully described hereinafter. A large ring-shaped gear 26 is secured to the underside of the turntable 22. This gear 26 meshes with a spur gear 27, which is keyed to the shaft 4.

In each hole 23 of the turntable 22 there is reciprocably mounted a piston 28. Each piston 28 has a piston rod 29 extending downwardly through a corresponding hole in the gear 26. Surrounding the lower end of the piston rod 29 is a helical spring 30, which bears against the underside of the gear 26 and against enlarged portion 31 on the end of the piston rod 29. The lower end 31 on each piston rod 29 bears against the upper surface of an adjustable cam track (or plate) 32 or against the upper portion of a stationary cam track 33, depending upon the relative rotary position of each piston at any given instance.

Figure 6:
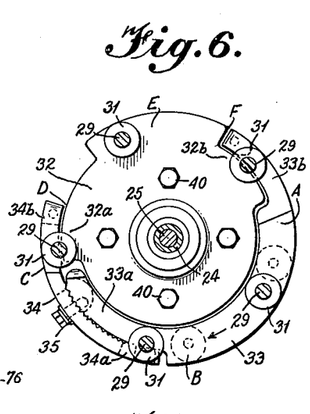
FIGURE 6 is a sectional view taken along section line 6—6 of FIGURE 2, showing the cam means associated with the turntable for forming the patties.
Figure 7:
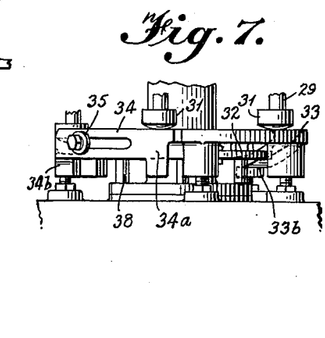
FIGURE 7 is a front elevation of the cam means shown in FIGURE 6.
Figure 7A:
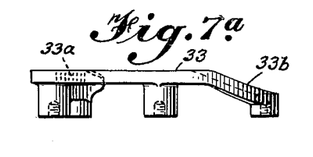
FIGURES 7a and 7b are side elevations, taken at appropriate angles, of the stationary cam track and the adjustable cam segment, respectively, shown in FIGURE 6.
Figure 7B:
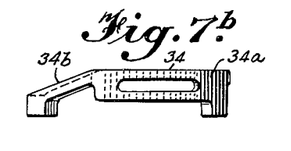

Referring now to FIGURES 2, 6 and 7, the cam track 32, which is adjustable, causes the pistons 28 to assume their lowermost positions as they pass clockwise beneath the hole 21 in the base plate 3 of the hopper. Cam track 33, which is stationary, causes the pistons 28 to be elevated to such an extent that the tops of the pistons are level with the surface of the turntable 22 when the pistons are moved to the position indicated by A in FIGURE 6. In riding over the surface of the cam track 33, the lower ends 31 of the piston rods 29 travel from point A to point B on a substantially level surface such that during this period of movement the tops of the pistons 28 are level with the surface of the turntable 22.

After passing beyond the point B, the piston rods slide over an intermediate cam segment 34 which is adjustably connected to the cam track 33 by means of bolt 35. The cam segment 34 includes a portion 34a which has an upper surface level with the surface of the cam track 33 and a portion 34b which has a sloping surface C. The portion 34a has on its vertical (side) surface, towards the center of the turntable, a series of vertical serrations which are adapted to mesh or mate with complementary serrations on the corresponding adjacent surface of extension 33a of the stationary cam 33. The side of the sloping portion 34b of the cam segment 34 lies along the side of an adjacent interfitting portion 32a of the lower adjustable cam 32. The sloping surface C of portion 34b reaches the lower level of cam 32 approximately at point D. The cam 32, forward of point D, extends over a flat uninterrupted portion E to the point F where the cam 32 meets the cam 33. At this juncture, cam 33 is provided with an extension 33b which slopes upwardly from point F, at or below the level of cam 32, to point A at the upper level of the cam 33. Cam 32 is provided with an adjacent interfitting portion 32b which lies along the side of the extension 33b of the stationary cam 33. (All portions of the adjustable cam 32 are at the same level.)

The bolt 35 may be loosened and the cam segment 34 may be moved clockwise or counterclockwise relative to the cams 32 and 33 after which the bolt may be retightened such that the cam segment 34 is secured in a new position. The intermating serrated surfaces on the portions 34a and 33a will hold the cam segment 34 in a plurality of different fixed positions as desired.

From a consideration of FIGURE 6, if the cam segment 34 is advanced in a clockwise direction, it should be apparent that the pistons will commence to descend at a later time with respect to their approach to the hole 21 in the base plate 3. It should be pointed out also that the lower ends of the piston rods are so located, with respect to the overlapping portions of the various cammed members described above, that these rods will ride along the dividing lines between any two overlapping portions. Thus, the piston will slide smoothly in moving from one cammed portion to another, although the uppermost cammed portion will determine the position of the pistons at any given instant.

From a consideration of FIGURES 2 and 7, it should be apparent that the position of the cam 32 will ultimately determine the relative location of each piston 28 within its hole 23 as it rides to its lowermost position beneath the hole 21 in the base plate 3. For the purpose of permitting a variable amount of material to be forced or deposited into each hole 23 above each piston 28, the cam track 32 is adjustable in a vertical direction. The shaft 25, as indicated heretofore, passes downwardly through sleeve 24. At the lowermost end of the rod 25 there is a horizontal plate 36 to which the rod 25 is secured by means of nut 37. A plurality of shorter rods, designated by the reference numeral 38, are secured at their lower ends to the horizontal plates 36 by means of nuts 39. The upper ends of these shorter rods 38 are secured to the cam track 32 by means of nuts 40. The upper end of the rod 25 is threaded, as at 41, and a nut 42 is received on the threaded portion 41. By suitably turning the nut 42 the rod 25 may be raised or lowered such that the cam track 32 will be correspondingly raised or lowered.

Thus, referring to FIGURE 2, if it is desired to effect a smaller volume in the hole 23 above the piston 28 than would be produced from the present relative positions of the elements shown in this figure, the nut 42 can be tightened so as to elevate the rod 25, causing the cam track 32 to be elevated accordingly. Thereafter, when the ends 31 of the piston rods 29 ride on the surface of the cam track 32 beneath the hole 21, the upper ends of the pistons 28 will be in a relatively higher position than as shown in FIGURE 2 and, thus, the quantity of meat or other moldable material that can be placed in the hole 23 will be diminished accordingly. The cam track 33 is not adjustable in the same sense as cam track 32, since the former cam must be so positioned that the upper ends of the pistons 28 will be on a level with the surface of the turntable 22.

As indicated heretofore the cam segment 34 permits a variation in the time when the pistons will commence to descend as they approach the hole 21 in the base plate 3. This action of the pistons is also correlated with the level of the adjustable cam 32. For example, if the position of the adjustable cam 32 is relatively high such that the resulting patty or cake (to be formed in the space 23 above the piston) is relatively thin, then it is desirable to have the cam segment 34 advanced clockwise so as to delay the starting of the downward movement of the piston whereby the time cycle for the filling of the space is reduced to a small interval of time. On the other hand, if the adjustable cam 32 is at or near its lowermost position such that the resulting cake or patty (formed in the space 23) is relatively thick, then the cam segment 34 should be moved counterclockwise so as to start the downward movement of the distance as soon as possible. Thus, for a relatively thick cake or patty, the time for the filling cycle is essentially at a maximum.

Referring again to FIGURES 1, 2 and 3, positioned to the right and slightly above the level of the turntable 22 is a rotatable plate 43 which is connected to a hub portion 44. The driving arrangements for hub 44 and plate 43 will be explained hereinafter. At spaced positions around the circumference of the plate 43 are located a plurality of holes 46. An impaling element 47 is adapted to pass through each one of the holes 46 in the plate 43. Each group of impaling elements 47 is attached to the under side of a disc 48 which is suitably mounted at the lower end of a reciprocable rod 49. For the purposes of illustration, five such discs and rods are shown in the drawings. Another horizontal plate 50 is spaced above the plate 43 for rotation therewith. The plate 50 is provided with suitable holes 51, through which the rods 49 are permitted to reciprocate. Above the plate 50, a stationary and circular cam track 52 is located. The upper ends of the rods 49 are resiliently urged against the lower edges of this cam track by means of springs 53, which bear against the upper ends of the plate 50 and against the upper enlarged ends of the rods 49.

The circular cam track 52 is held in a stationary position at three different points. At its center, the circular cam 52 is secured to a rod 55, which passes through the hub portion 44 of the plate 43; a suitable nut 56 engages the upper threaded portion 57 of this rod 55. At two other positions on the circular cam track 52 there are provided radial extensions 58 and 59 which are secured to vertical posts 60 and 61 by means of threaded nuts 62 and 63, respectively.

As will appear hereinafter, the rotation of the plate 43 is synchronized with the rotation of the turntable 22. At the same time, the configuration of the lower surface of the circular cam 52 is such that the impaling elements 47 and the discs 48 are urged downwardly into position in timed relation with the advance of the pistons 28 on the turntable 22. Thus, when the corresponding pistons 28 and discs 48 reach the position indicated by G in FIGURE 1, the impaling elements 47 will be urged downwardly and into any patty or block of material that happens to be resting on the upper surface of the corresponding pistons 28. Continued rotation of the plate 43 thereafter will slide the patty off the turntable since the patty will now be held on the impaling elements 47.

As shown in FIGURE 3, the right-hand disc 48, with its impaling elements 47, is in its uppermost position. In fact, the bottom of the track 52 is such that, with the disc 48 in its uppermost position under the action of the spring 53, a small amount of clearance is provided between the upper end of the rod 49 and the lower surface of the track. On the other hand, the left-hand disc 48, together with its impaling elements 47, is in its lowermost position such that the disc is almost touching the plate 43. The same conditions hold true with regard to FIGURE 2 in that the right-hand disc 48 is in its uppermost position and the left-hand disc 48 is in its lowermost position.

When each disc 48 is rotated to the position indicated by H in FIGURE 1, the impaling elements 47 and disc 48 are elevated such that the impaling elements 47 are withdrawn upwardly through the holes 46 in the plate 43, causing the meat patty or other piece of moldable material (previously held on these impaling elements) to drop at this particular location. As shown in FIGURE 1, the patties may drop conveniently upon a conveyor belt 70.

Figure 5:
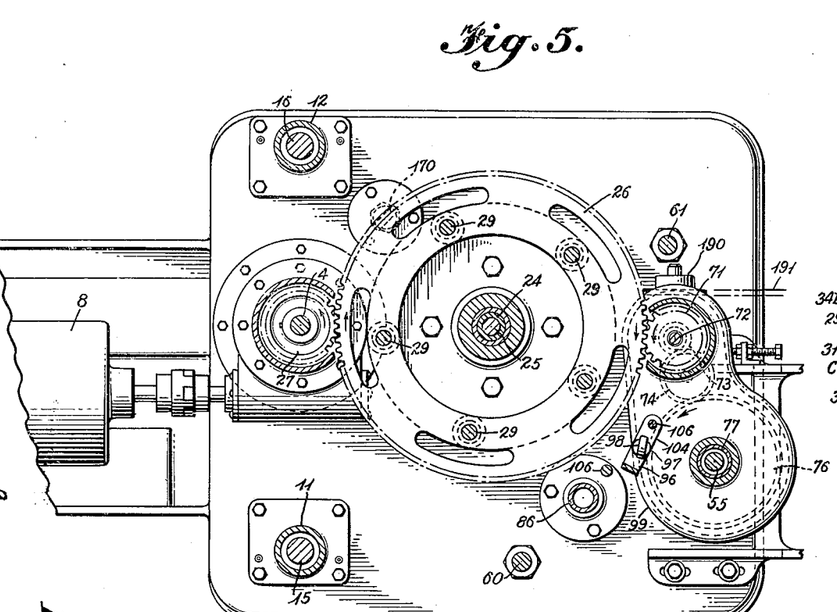
FIGURE 5 is a sectional view taken along section line 5—5 of FIGURE 2, showing the driving relationship between the various rotatable elements of the present invention.

Referring now to FIGURES 2, 3 and 5, means are provided for turning the plate 43 at the same rotary speed as the turntable 22. The gear 26, which is driven by the spur gear 27, also drives another spur gear 71 on the shaft 72. A smaller spur gear 73 is keyed to the shaft 72 below the spur gear 71. Spur gear 73 meshes with an idler gear 74, which in turn meshes with large spur gear 76, which is keyed to the sleeve 77. Sleeve 77 is also keyed to the hub 44 of the plate 43. The relationship between the sizes of the various gears described above is such that the plate 43 will rotate in a counter-clockwise direction and at the same rotary speed as the turntable 22.

Figures 8, 10:
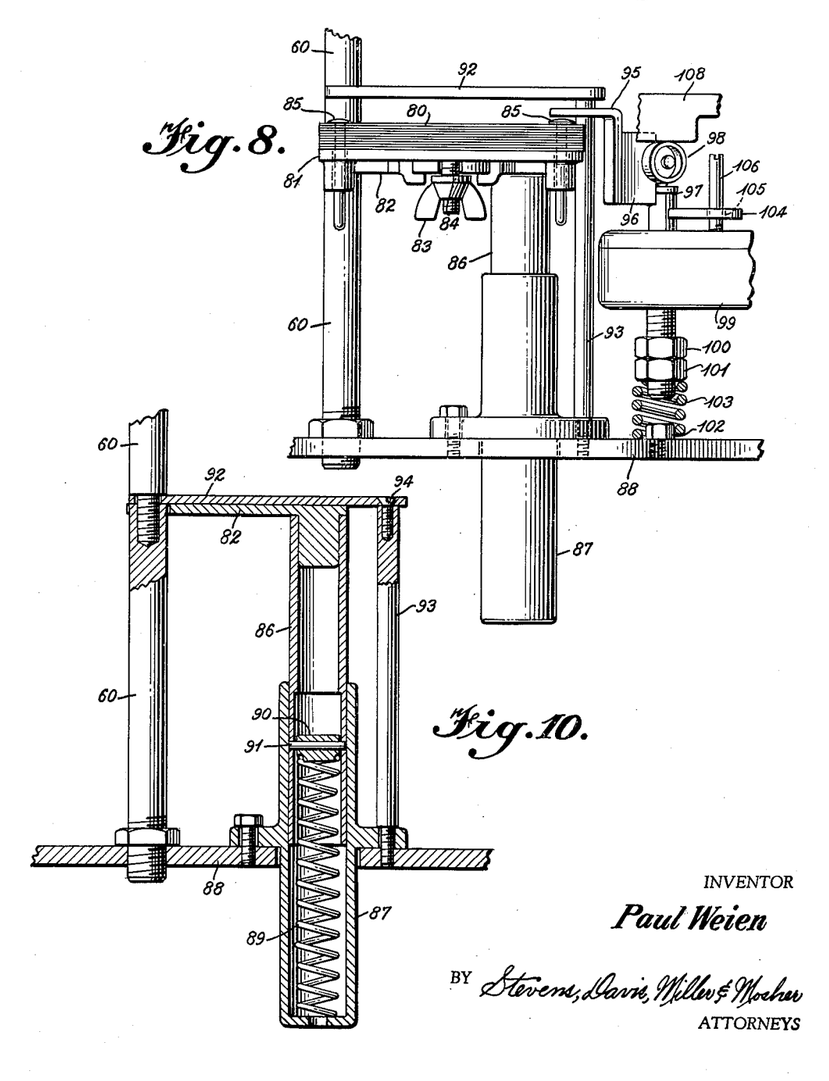
FIGURE 8 is an elevation view, on a slightly enlarged scale, of a paper dispensing means associated with the present invention.
FIGURE 10 is a section corresponding to the elevation of FIGURE 8 showing the internal spring mounting for this mechanism.
Figure 9:
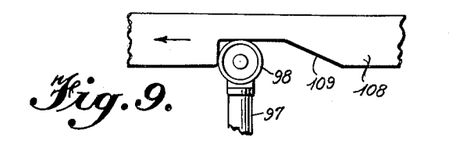
FIGURE 9 is a fragmentary view of the cam means for operating the mechanism shown in FIGURE 8.

As shown in FIGURES 1 and 3 and in further detail in FIGURES 8, 9 and 10, the present invention also provides a means for dispensing small rectangular pieces of paper, these papers being placed beneath the patties as the same are moved from the turntable by the impaling elements towards the conveyor belt 70. The motivating force for carrying the papers from their holder is the force of movement of the patty itself past the block of papers. The block of papers is moved up and down in accordance with the rotation of the plate 43 such that, as each patty is moved from the turntable 22 under the action of the impaling elements 47, the block of papers is moved upwardly against the underside of the patty then passing by. The structure for accomplishing this action comprises a package of papers 80 resting on a flat plate 81. Plate 81 is removably attached to a supporting plate 82 by means of a wing nut 83, which engages a threaded rod 84 attached to the underside of plate 81 and passing through a suitable slot in the plate 82. A pair of pins 85 pass through suitable holes in the paper and in the plate 81 for the purpose of securing the papers 80 in a substantially fixed position relative to the plate 81.

As best shown in FIGURE 10, plate 82 has a tubular extension 86 which is received within the bore of a cylindrical cartridge 87, the latter being secured to a horizontal plate 88 forming a portion of the base structure of the present device. A spring 89 bears against the lower end of the cartridge 87 and, at its upper end, against a plug 90, which is secured within the sleeve 86 by means of a pin 91. Another horizontal plate 92 is secured at one side between two sections of the post 60 and at its other side is secured to a vertical rod 93 by means of a screw 94. The lower end of the rod 93 passes through a suitable hole in the cartridge 87 and engages a hole in the plate 88. It should be apparent that the vertical plate 92 will provide a stop for the upper vertical limit of the horizontal plate 82 in the event that the plate 81 and the papers 80 are not attached to the plate 82.

As shown in FIGURE 8, an arm 95 is located to one side of the pad 80 such that the horizontal portion of this arm bears against the right-hand pin 85. The vertical portion of the arm 95 is provided with a horizontal extension 96 which is attached to a reciprocable rod 97. At the upper end of the rod 97 there is attached a roller 98. The rod 97 passes through suitable holes in an extension of the housing 99. The lower end of the rod 97 is threaded such that two nuts 100 and 101 are received on this threaded end of the rod. A smaller screw 102 is received within a suitable hole in the plate 88 and in a position directly below the end of the rod 97. A spring 103 is received around the lower end of the rod 97 and over the head of the screw 102. Thus, the spring 103 urges the rod 97 in an upward direction. In order to prevent the rod 97 from rotating about its longitudinal axis, there is provided a horizontally projecting tab 104 which is welded at its inner end to the rod 97. The tab 104 is provided with a suitable hole 105 through which passes a guide rod 106. The guide rod 106 is threaded into a suitable hole in the housing 99. The hole 105 is sufficiently large to permit relative vertical movement between the tab 104 and the guide rod 106.

A further circular cam track 108 is secured to the hub portion 44 of the horizontal plate 43 for rotation therewith. The circular cam track 108 is provided with five identically-shaped depressions 109, which permit the roller 98, which is bearing against the under surface of the track 108, to move up abruptly as soon as the patty is passing over the pack of papers 80. As the cam track 108 continues to rotate, the roller 98 will follow the inclined surface of the depression 109 and the pack of papers 80 will be lowered again to the initial position as shown in FIGURE 8.

Figures 11, 12, 13:
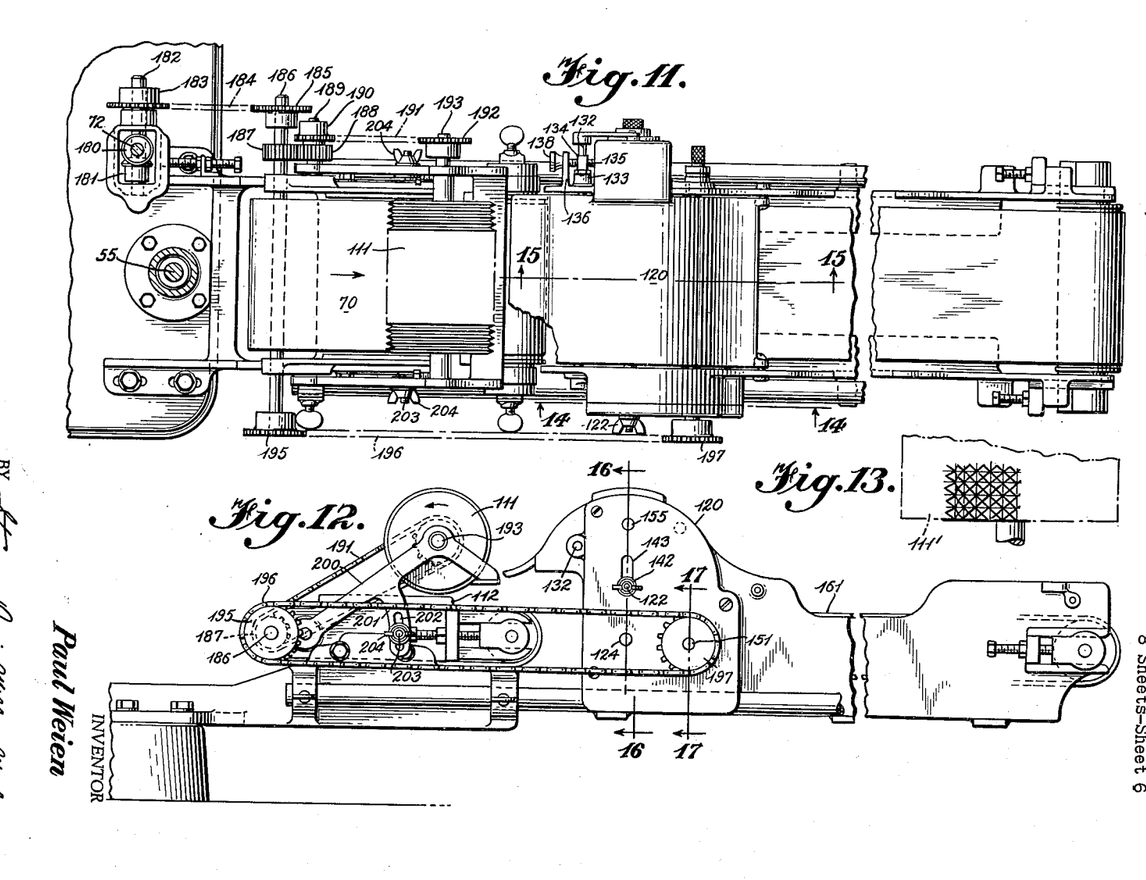
FIGURE 11 is a plan view of the structure which extends to the right of the structure shown in FIGURE 1.
FIGURE 12 is a front elevation of the structure shown in FIGURE 11.
FIGURE 13 is a fragmentary view, on a somewhat enlarged scale, of a modified form of the pattern roll shown in FIGURE 11.

As shown to the right in FIGURES 1 and 2 and in greater detail in FIGURES 11 and 12, the patties, as they are caused to fall due to the elevation of the impaling elements, may be deposited conveniently on a belt 70. The drive for the belt will be discussed hereinafter. As the upper course of the belt 70 moves towards the right, each patty will pass beneath a pattern roll 111. This pattern roll, which is also driven, has a series of circumferential grooves, as shown in FIGURE 11, so as to provide a pattern of that design on the patty that is passing beneath the roller. Alternatively, the pattern roll 111 may have a knurled surface as indicated diagrammatically in FIGURE 13 by the roll 111'.

Figure 14:
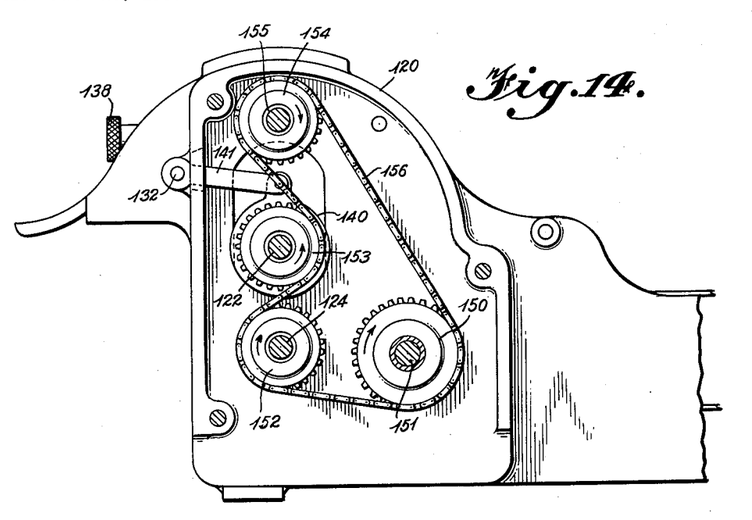
FIGURE 14 is a sectional view, on an enlarged scale, taken along section line 14—14 of FIGURE 11, and showing the drive means for the scoring or transfer unit associated with the present invention.
Figure 15:
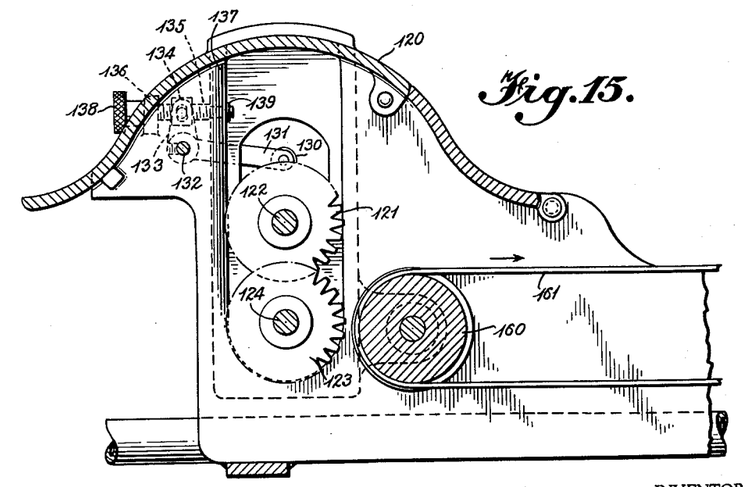
FIGURE 15 is a sectional view, on an enlarged scale, taken along section line 15—15 of FIGURE 11, and showing the relative association between the upper and lower portions of the scoring or transfer unit.
Figure 16:
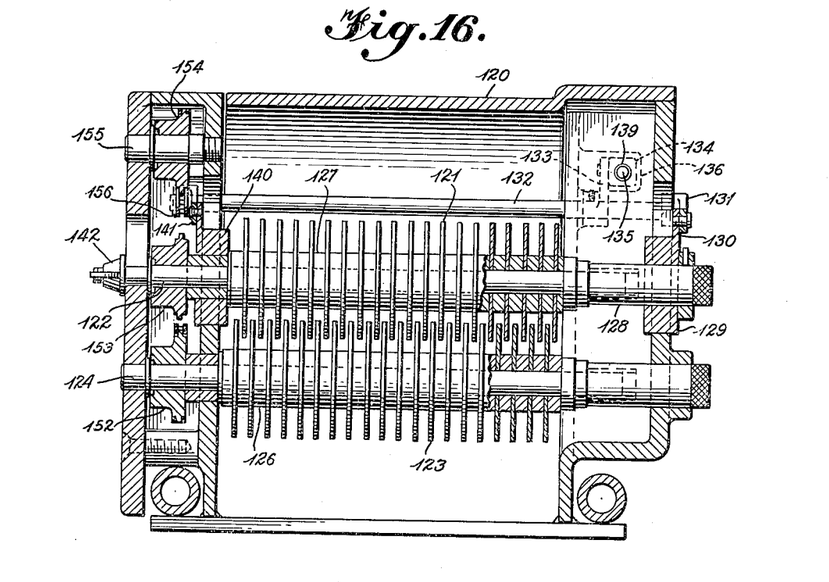
FIGURE 16 is a sectional view, on an enlarged scale, taken along section line 16—16 of FIGURE 12.

After passing beneath the pattern roll 111', the patties, one of which is shown in FIGURE 12 and designated by the reference character 112, may pass through a scoring or transfer unit, the details of which are shown more particularly in FIGURES 14, 15, 16 and 17. The scoring or transfer unit comprises a housing 120, in which are mounted a first and lower series of intercalating discs or knives. Referring to FIGURES 15 and 16, a first plurality of discs 121 is mounted for rotation on an upper horizontal shaft 122. A second plurality of discs 123 is mounted for rotation on a lower horizontal shaft 124. As shown in FIGURE 15, discs 121 and 123 may be provided with suitable teeth if desired.

The lower discs 123 are mounted in a sleeve 126 which is freely rotatable relative to the shaft 124. Similarly, discs 121 are mounted in a sleeve 127, which is freely rotatable relative to the shaft 122. Also, it should be pointed out that shaft 124 is not vertically movable as is the case with shaft 122. At the right-hand end of the shaft 122, as it appears in FIGURE 16, the shaft is mounted in a bearing member 128 which passes through a block 129. The upper end of block 129 is provided with an extension 130 which is pivotally attached to the outer end of an arm 131. Arm 131 is keyed to a shaft 132 upon which is also keyed another arm 133. Attached to the outer end of the arm 133 is a threaded nut 134 which is suitably received on a threaded bolt 135. Bolt 135 passed through flanges 136 and 137. At one end this bolt is provided with a knurled head 138 and at the other end with a lock nut 139, which prevent axial movement of the threaded bolt 135. Adjacent the other end of the shaft 122 there is provided another bearing block 140 (similar to the bearing block 129) which is also attached to an arm 141, the latter being keyed to the shaft 132.

At the extreme left-hand end of the shaft 122, as it appears in FIGURE 16, there is provided a wing nut 142, which engages the outer threaded portion of this shaft. Referring now to FIGURE 12, there is shown a vertical slot 143 on the side of the casing 120. Thus, when the position of shaft 122 is varied by turning the knurled nut 138 in one direction or the other, the end of the shaft 122 will be moved upwardly or downwardly in the slot 143. When the desired adjustment has been reached, the wing nut 142 may be tightened against the side of the housing 120 and, thus, locking the shaft 122 in the desired position.

The driving arrangement for the sleeves 126 and 127 is shown in FIGURE 14. A drive sprocket 150 is keyed to a shaft 151. A sprocket 152 is freely rotatably mounted on the end of the shaft 124 and is connected in driving relation with the sleeve 126. Another sprocket 153 is freely rotatably mounted on the shaft 122 and is connected in driving relation with the sleeve 127. Idler sprocket 154 is rotatably mounted on a stub shaft 155 which is journaled in a portion of the housing 120. A chain 156 passes around sprockets 150, 152, 153 and 154 in the manner shown in FIGURE 14. Chain 156 drives the sprocket 152 in a clockwise direction and the sprocket 153 in a counterclockwise direction, with a corresponding movement of the sleeves 126 and 127 and their discs 123 and 121, respectively.

Figure 17:
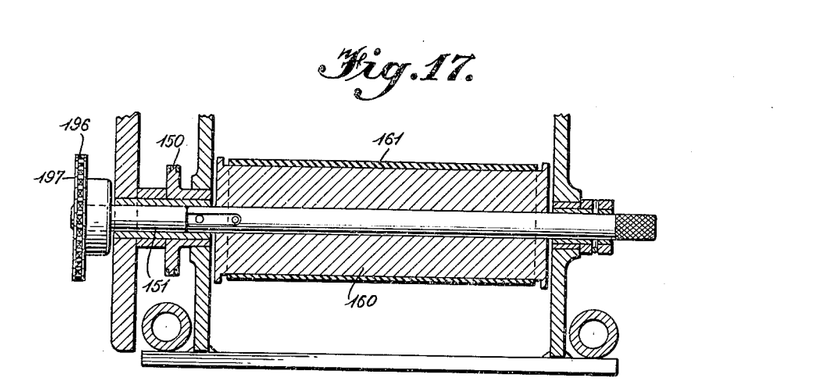
FIGURE 17 is a sectional view, on an enlarged scale, taken along section line 17—17 of FIGURE 12.

As shown in FIGURE 17, shaft 151 is also connected in driving relation with a roller 160 over which belt 161 passes. The belt 161 will carry the patties which have passed between the lower and upper knife blades 123 and 121, respectively, and convey them to any convenient location.

The scoring and transfer unit has been described above in relation to upper and lower rollers which are provided with knives in the form of discs. It should be understood that the discs may be of any desired shape and, in this regard, the rollers shown in the drawings may be replaced with rollers having knives of a shape essentially different from those illustrated. When both rollers are provided with knives as shown, the patties passing through this unit will be scored on both the upper and lower surfaces. If it is desired to provide scoring on the upper surfaces only of the patties, the lower roller may be replaced by a smooth solid roller (not shown) in which case the patties may pass through this unit with the rectangular pieces of papers adhering to their lower surfaces. When the upper roller is moved to its uppermost position this device acts merely as a transfer unit.

FIGURE 3 shows a roller 170 mounted at the upper end of a vertical threaded rod 171. The threaded rod 171 is positioned by a nut 172 in an upward direction such that the roller 170 bears against the underside of the gear 125 for the purpose of counterbalancing the downward forces that are exerted against the turntable adjacent the bottom of the rotatable hopper 1.

Again in FIGURE 3, the lower end of shaft 72 is keyed to a bevel gear 180. Bevel gear 180, in turn, drives another bevel gear 181 which is keyed to a horizontal shaft 182. As shown in FIGURE 11, a sprocket wheel 183 is keyed to the outer end of the shaft 182. Chain 184, designated by the dotted lines, passes around the sprocket wheel 183 and also around sprocket wheel 185 mounted on one end of shaft 186. A spur gear 187 keyed to the shaft 186 meshes with another spur gear 188 keyed to the shaft 189. A sprocket wheel 190 is also keyed to the outer end of the shaft 190. A chain 191 passes around the sprocket 190 and also around a sprocket 192 which is keyed to one end of a shaft 193. The pattern roller 111 is mounted on the latter shaft.

The interrelationship between the various driving elements described above is such that the pattern roller 111 is driven in the direction indicated by the arrow in FIGURE 12 and at the same peripheral speed as that of the conveyor belt passing beneath. Where the pattern roller is of the type indicated by reference number 111, the thickness of the patty will be decreased and its horizontal dimension will be increased essentially in a longitudinal direction. On the other hand, when the pattern roller 111′ is employed, the patty will be flattened in both the longitudinal and transverse directions.

At the opposite end of the shaft 186 from the sprocket 185 there is also keyed a sprocket 195. A chain 196 passes around sprocket 195 and also around sprocket 197 which is keyed to the shaft 151 within the scoring or transfer unit 120.

As shown in FIGURES 11 and 12, the ends of the shaft 193 of the pattern roll 111 pass through a pair of parallel and pivotal arms 200. The arms 200 are provided with extensions 201, in which are located slots 202. The supporting frame for the pattern roll is provided with projecting threaded bolts 203 upon which are received wing nuts 204. By relatively loosening or tightening the wing nuts 204, the arms 200 may be pivoted about the lower left-hand ends thereof so as to permit a relative lifting or lowering of the pattern roll 111.

The operation of the mechanism heretofore described structurally will now be set forth in greater detail. After electrical power has been supplied to the motor 8 for the purpose of causing rotation of the above described elements of the present invention, a quantity of ground meat or other moldable material may be deposited in the rotatable cylindrical hopper 1. The meat or other moldable material may be chilled as desired for optimum molding conditions. As the cylindrical hopper rotates in a counterclockwise direction (referring to FIGURE 1) the material within the hopper will be urged beneath the stationary pitched blade 20 and into the hole 21 in the plate 3. As the turntable 22 rotates in a clockwise direction, and as the holes 23 come into registry with the hole 21 of the stationary plate 3, the pressure against the material in the hopper, due to the frictional contact between the material and the rotating hopper, will force the material into the pocket 23. It should be understood that the material is forced into the pockets 23 in the manner described above without compressing the material to the same degree that this corresponding molding action is accomplished in prior art machines designed for the same purpose. As indicated previously, the depth of this pocket 23 will be determined by the position of the cam track 32, which, in turn, determines the location of the upper surface of the piston 28. As the turntable 22 continues to rotate in a clockwise direction, the pistons 28 will be elevated to the level of the turntable as they pass from beneath the rotating hopper 1.

As the turntable rotates to the position indicated by the reference character G in FIGURE 1, the impaling elements 47 mounted on the disc 48 will descend in synchronism with this movement and impale the patty. The plate 43, upon which all of the impaling elements are mounted, will continue to rotate until, under the action of the cam 52, the impaling elements will be elevated as they approach the position designated by the reference character H and, thereafter, the patty will fall upon the belt 70.

Prior to its discharge onto the belt 70, the patty which is held by the impaling elements will pass over the pack of papers 80. The roller 98, which rides on the under surface of the cam 108, will be urged into the recesses 109 in timed relation with the passage of the patty over the pack of paper 80 so as to cause the pack 80 to be moved upwardly against the under surface of the patty. Frictional contact between the under surface of the patty and the pack of paper 80 will cause the uppermost piece of paper to slide from the pack; the patty, with paper adhering thereto, will be moved to the position where it will be dropped on the belt 70 in the manner described above. The use of the paper dispenser is optional.

Now if desired, the patty may pass along the conveyor belt and under the pattern roll 111 or 111′, depending upon which particular pattern roll is being employed at that time.

Also, if desired, the patties leaving the pattern roll 111 may be passed into the scoring or transfer unit 120, from which they may be then sent to a place for packaging or other suitable consumption of the thus formed products.

Where the present invention has been described in particular relation to the drawings attached hereto, it should be understood that other and further modifications, apart from those shown or suggested herein, might be made within the spirit and scope of this invention.

What is claimed is:

1. A molding machine comprising a stationary and substantially horizontal base plate, said base plate having a hole for the passage of moldable material therethrough, a rotatable spider mounted on said base plate and being rotatable over said hole, said spider being provided with a plurality of radial arms having open spaces therebetween, a rotatable hopper mounted on said rotatable spider, means operatively connected to said spider for rotating said spider and said rotatable hopper, a stationary pitched blade mounted within said hopper above said spider and said hole in said stationary base plate for directing material into said hole as said material is urged against said blade by virtue of the frictional contact between said material and the sides of said rotatable hopper, and means mounted below said base plate in registry with said hole for forming successive molded products from said moldable material as the same is urged from said hole to said forming means.

2. A molding machine comprising a stationary and substantially horizontal base plate, said base plate having a hole for the passage of moldable material therethrough, a rotatable spider mounted on said base plate and being rotatable over said hole, said spider being provided with a plurality of radial arms having open spaces therebetween, a rotatable hopper mounted on said rotatable spider, means operatively connected to said spider for rotating said spider and said rotatable hopper, a stationary pitched blade mounted within said hopper above said spider and said hole in said stationary base plate for directing said material into said hole as said material is urged against said blade by virtue of the frictional contact between said material and the sides of said rotatable hopper, a turntable mounted for rotation on a substantially vertical axis, said turntable having therein a plurality of holes each individually registerable with said hole in said base plate, the upper surface of said turntable being positioned below the lower surface of said stationary base plate in the region surrounding said hole of said base plate, a plurality of pistons mounted within said holes of said turntable for reciprocating movement in a vertical direction, means responsive to the movement of each piston beneath said rotatable hopper for moving each said piston to a lower position in its respective hole for providing a space above the upper surface of each said piston and the surface of said turntable, and means responsive to the movement of each piston away from said rotatable hopper for moving each said piston upwardly until the upper surface of each said piston is substantially level with the surface of said turntable.

3. A molding machine comprising a stationary and substantially horizontal base plate, said base plate having a hole for the passage of moldable material therethrough, a rotatable spider mounted on said base plate and being rotatable over said hole, said spider being provided with a plurality of radial arms having open spaces therebetween, a rotatable hopper mounted on said rotatable spider, means operatively connected to said spider for rotating said spider and said rotatable hopper, a stationary pitched blade mounted within said hopper above said spider and said hole in said stationary base plate for directing said material into said hole as said material is urged against said blade by virtue of the frictional contact between said material and the sides of said rotatable hopper, a turntable mounted for rotation on a substantially vertical axis, said turntable having therein a plurality of holes each being individually registerable with said hole in said base plate, the upper surface of said turntable, along a first portion thereof, being positioned below the lower surface of said stationary base plate in the region surrounding said hole of said base plate, a plurality of pistons mounted within said holes of said turntable for reciprocating movement in a vertical direction, means responsive to the movement of each piston beneath said rotatable hopper for moving each said piston to a lower position in its respective hole for providing a space above the upper surface of each said piston and the surface of said turntable, means responsive to the movement of each piston away from said rotatable hopper for moving each said piston upwardly until the upper surface of each said piston is substantially level with the surface of said turntable, a rotatable support mounted on a vertical axis spaced from the rotational axis of said turntable, a plurality of vertically reciprocable material engaging means mounted in said rotatable support, means responsive to the movement of each material-engaging means on said rotatable support over a second portion of said turntable for urging each said material engaging means downwardly as each said material engaging means passes over said second portion of said turntable, and means for rotating said turntable and said rotatable support in synchronism.

4. A molding machine comprising a rotatable hopper mounted for rotation on a substantially vertical axis, a stationary and substantially horizontal base plate mounted beneath said rotatable hopper and enclosing the lower end thereof, said base plate having a hole for the passage of moldable material therethrough, means operatively connected to said hopper for rotating said rotatable hopper, a spider mounted at the lower end of said hopper for rotation therewith, said spider being located directly adjacent said base plate and being provided with a plurality of radial arms having open spaces therebetween, a stationary pitched blade mounted within said hopper above said spider and said hole in said stationary base plate for directing material into said hole as said material is urged against said blade by virtue of the frictional contact between said material and the sides of said rotatable hopper, a turntable mounted for rotation on a substantially vertical axis, said turntable having therein a plurality of cylindrically shaped holes, each individually registerable with said hole in said base plate, the upper surface of said turntable bearing against the lower surface of said stationary base plate in the region surrounding said hole of said base plate, a plurality of pistons mounted within said holes of said turntable, means resiliently urging said pistons in a downward direction, a first cam positioned beneath said turntable and partly beneath said rotatable hopper for moving said pistons to lowermost positions in their respective holes as said pistons move beneath said rotatable hopper, said pistons in their lowermost positions providing a space above the upper surface of said pistons and the surface of said turntable, a second cam positioned beneath said turntable and away from said rotatable hopper for moving said pistons upwardly until the upper surfaces of said pistons are substantially level with the surface of said turntable, a rotatable support mounted on a vertical axis spaced from the rotational axis of said turntable, a plurality of vertically reciprocable material engaging means mounted in said rotatable support, said material engaging means being movable with their rotatable support in a cylindrical path passing over a portion of said turntable, means for urging said material engaging means resiliently in an upward direction, a third cam for urging said material engaging means downwardly as each said material engaging means passes over said turntable, and means for rotating said turntable and said rotatable support in synchronism.

5. The improvement as set forth in claim 4 including a substantially horizontal paper-supporting plate mounted for vertical reciprocating movement beneath said rotatable support, means for mounting a pack of papers on said paper-supporting plate, means responsive to the movement of each material engaging means over said turntable for moving said paper-supporting plate upwardly towards and subjacent each said material engaging means.

6. A molding machine comprising a hopper, a base plate mounted below said hopper and supporting the same, said base plate having a hole for the passage of moldable material therethrough, a molding device mounted for movement beneath said base plate, said molding device having therein a plurality of holes each individually registerable with said hole in said base plate, a plurality of pistons mounted within said holes of said molding device, a first cam positioned beneath said molding device and partly beneath said hopper for moving said pistons to lowermost positions in their respective holes as said pistons move beneath said hole in said base plate, said pistons in their lowermost positions providing a space above the upper surface of said pistons and the upper surface of said molding device, a second cam positioned beneath said molding device and away from said hopper for moving said pistons upwardly until the upper surfaces of said pistons are substantially level with the surface of said molding device, an adjusting cam segment positioned between the trailing end of said second cam and the leading end of said first cam, said cam segment having a first portion adjacent said second cam substantially coplanar therewith and a second portion inclined downwardly from said first portion towards said first cam, said second portion of said cam segment providing an inclined surface for effecting downward movement of said pistons to their lowermost positions, and means for adjusting said cam segment towards and away from said hole in said base plate to effect a change in the location where the pistons commence their downward movement as they approach said hole in said base plate, whereby the filling time cycle of said molding device is correspondingly changed.

7. A molding machine comprising a hopper, a base plate mounted below said hopper and supporting the same, said base plate having a hole for the passage of moldable material therethrough, a turntable mounted for rotation on a substantially vertical axis, said turntable being substantially flat on its upper surface and having therein a plurality of holes each individually registerable with said hole in said base plate, a plurality of pistons mounted within said holes of said turntable, means resiliently urging said pistons in a downward direction, a first cam positioned beneath said turntable and partly beneath said hopper for moving said pistons to lowermost positions in their respective holes as said pistons move beneath said hole in said base plate, said pistons in their lowermost positions providing a space above the upper surface of said pistons and the upper surface of said turntable, a second cam positioned beneath said turntable and away from said hopper for moving said pistons upwardly until the upper surfaces of said pistons are substantially level with the surface of said turntable, an adjusting cam segment positioned between the trailing end of said second cam and the leading end of said first cam, said cam segment having a first portion adjacent said second cam substantially coplanar therewith and a second portion inclined downwardly from said first portion towards said first cam, said second portion of said cam segment providing an inclined surface for effecting downward movement of said pistons to their lowermost positions, and means for adjusting said cam segment in a clockwise and a counterclockwise direction relative to the vertical axis of said turntable to effect a change in the location where said pistons commence their downward movement as they approach said hole in said base plate, whereby the filling time cycle of said molding device is correspondingly changed.

8. A molding machine comprising a hopper mounted for rotation on a substantially vertical axis, a stationary and substantially horizontal base plate mounted beneath said hopper and enclosing the lower end thereof, said base plate having a hole for the passage of moldable material therethrough, means for rotating said rotatable hopper, a stationary blade mounted within said hopper above said hole in said stationary base plate for directing said material into said hole as said material is urged against said blade by virtue of the frictional contact between said material and the sides of said rotatable hopper, a molding device mounted for movement beneath said base plate, said molding device having therein a plurality of holes each individually registerable with said hole in said base plate, a plurality of pistons mounted within said holes of said molding device, a first cam positioned beneath said molding device and partly beneath said hopper for moving said pistons to lowermost positions in their respective holes as said pistons move beneath said hole in said base plate, said pistons in their lowermost positions providing a space above the upper surface of said pistons and the upper surface of said molding device, a second cam positioned beneath said molding device and away from said hopper for moving said pistons upwardly until the upper surfaces of said pistons are substantially level with the surface of said molding device, an adjusting cam segment positioned between the trailing end of said second cam and the leading end of said first cam, said cam segment having a first portion adjacent said second cam substantially coplanar therewith and a second portion inclined downwardly from said first portion towards said first cam, said second portion of said cam segment providing an inclined surface for effecting downward movement of said pistons to their lowermost positions, and means for adjusting said cam segment towards and away from said hole in said base plate to effect a change in the location where the pistons commence their downward movement as they approach said hole in said base plate, whereby the filling time cycle of said molding device is correspondingly changed.

9. A molding machine comprising a hopper mounted for rotation on a substantially vertical axis, a stationary and substantially horizontal base plate mounted beneath said hopper and enclosing the lower end thereof, said base plate having a hole for the passage of moldable material therethrough, means for rotating said rotatable hopper, a stationary blade mounted within said hopper above said hole in said stationary base plate for directing said material into said hole as said material is urged against said blade by virtue of the frictional contact between said material and the sides of said rotatable hopper, a turntable mounted for rotation on a substantially vertical axis, said turntable being substantially flat along its upper surface and having therein a plurality of holes each individually registerable with said hole in said base plate, a plurality of pistons mounted within said holes of said turntable, means resiliently urging said pistons in a downward direction, a first cam positioned beneath said turntable and partly beneath said hopper for moving said pistons to lowermost positions in their respective holes as said pistons move beneath said hole in said base plate, said pistons in their lowermost positions providing a space above the upper surface of said pistons and the upper surface of said turntable, a second cam positioned beneath said turntable and away from said hopper for moving said pistons upwardly until the upper surfaces of said pistons are substantially level with the surface of said turntable, an adjusting cam segment positioned between the trailing end of said second cam and the leading end of said first cam, said cam segment having a first portion adjacent said second cam substantially coplanar therewith and a second portion inclined downwardly from said first portion towards said first cam, said second portion of said cam segment providing an inclined surface for effecting downward movement of said pistons to their lowermost positions, and means for adjusting said cam segment in a clockwise and a counterclockwise direction relative to the vertical axis of said turntable to effect a change in the location where said pistons commence their downward movement as they approach said hole in said base plate, whereby the filling time cycle of said molding device is correspondingly changed.

10. A molding machine comprising a hopper, a substantially horizontal base plate mounted beneath said hopper and enclosing the lower end thereof, said base plate having a hole for the passage of moldable material therethrough, a turntable mounted for rotation on a substantially vertical axis, said turntable having therein a plurality of holes each individually registerable with said hole in said base plate, the upper surface of said turntable, along a first portion thereof, being positioned below the lower surface of said stationary base plate in the region surrounding said hole of said base plate, a plurality of pistons mounted within said holes of said turntable for reciprocating movement in a vertical direction, means responsive to the movement of each piston beneath said hopper for moving each said piston to a lower position in its respective hole for providing a space above the upper surface of each said piston and the surface of said turntable, means responsive to the movement of each piston away from said hopper for moving each said piston upwardly until the upper surface of each said piston is substantially level with the surface of said turntable, a rotatable support mounted on a vertical axis spaced from the rotational axis of said turntable, a plurality of vertically reciprocable article-engaging means mounted in said rotatable support, means responsive to the movement of each article-engaging means on said rotatable support over a second portion of said turntable for urging each said article-engaging means downwardly as each said article-engaging means passes over said second portion of said turntable, and means for rotating said turntable and said rotatable support in synchronism.

11. A molding machine comprising a hopper, a substantially horizontal base plate mounted beneath said hopper and enclosing the lower end thereof, said base plate having a hole for the passage of moldable material therethrough, a turntable mounted for rotation on a substantially vertical axis, said turntable having therein a plurality of holes each individually registerable with said hole in said base plate, the upper surface of said turntable bearing against the lower surface of said stationary base plate in the region surrounding said hole of said base plate, a plurality of pistons mounted within said holes of said turntable, means resiliently urging said pistons in a downward direction, a first cam positioned beneath said turntable and partly beneath said hopper for positioning said pistons in lowermost positions in their respective holes as said pistons move beneath said rotatable hopper, said pistons in their lowermost positions providing a space above the upper surface of said pistons and the upper surface of said turntable whereby, as said holes of said turntable pass beneath said hole of said base plate in registry therewith, said material in said hopper passes into said space so as to form a shaped product, a second cam positioned beneath said turntable and away from said hopper for moving said pistons upwardly until the upper surfaces of said pistons are substantially level with the surface of said turntable, whereby, as the pistons of said turntable move in a direction away from said hopper, the upper surfaces of said pistons and the resulting shaped products thereon are moved to the level of the surface of said turntable, a rotatable support mounted on a vertical axis spaced from the rotational axis of said turntable, a plurality of vertically reciprocable impaling means mounted on said rotatable support, said impaling means being movable downwardly through corresponding holes in said rotatable support and being movable with their rotatable support in a circular path passing over said turntable, means for urging said impaling means resiliently in an upward direction, a third cam for urging said impaling means downwardly through the holes in said rotatable support as each said impaling means passes over said turntable, means for rotating said turntable and said rotatable support in synchronism, whereby, as said turntable moves said shaped products on said pistons from beneath said hopper to the level of said turntable and into a position below the path of said impaling means, a corresponding impaling means descends and impales each shaped product and slides the same from said turntable, and means responsive to the continued rotation of said rotatable support for elevating said impaling means upwardly through the holes in said rotatable support for releasing said shaped product from said impaling means.

12. The improvement as set forth in claim 11 including a substantially horizontal paper-supporting plate mounted for vertical reciprocating movement beneath said rotatable support, means for mounting a pack of papers on said paper-supporting plate, means responsive to the movement of each impaling means over said turntable for moving said paper-supporting plate upwardly towards and subjacent each said impaling means.

13. A molding machine comprising a cylindrical hopper mounted for rotation on a substantially vertical axis, a stationary and substantially horizontal base plate mounted beneath said hopper and enclosing the lower end thereof, said base plate having a hole for the passage of moldable material therethrough, means for rotating said rotatable hopper, a stationary pitched blade mounted within said hopper above said hole in said stationary base plate for directing said material into said hole as said material is urged against said blade by virtue of the frictional contact between said material and the sides of said rotatable hopper, a turntable mounted for rotation on a substantially vertical axis, said turntable having therein a plurality of cylindrically shaped holes each individually registerable with said hole in said base plate, the upper surface of said turntable bearing against the lower surface of said stationary base plate in the region surrounding said hole of said base plate, a plurality of pistons mounted within said holes of said turntable, means resiliently urging said pistons in a downward direction, a first cam positioned beneath said turntable and partly beneath said rotatable hopper for positioning said pistons in lowermost positions in their respective holes as said pistons move beneath said rotatable hopper, said pistons in their lowermost positions providing a space above the upper surface of said pistons and the upper surface of said turntable whereby, as said holes of said turntable pass beneath said hole of said base plate in registry therewith, said material in said hopper is forced into said space so as to form a resulting cylindrically shaped product, a second cam positioned beneath said turntable and away from said rotatable hopper for moving said pistons upwardly until the upper surfaces of said pistons are substantially level with the surface of said turntable, whereby, as the pistons of said turntable move in a direction away from said rotatable hopper the upper surfaces of said pistons and the resulting shaped products thereon are moved to the level of the surface of said turntable, a rotatable support mounted on a vertical axis spaced from the rotational axis of said turntable, a plurality of vertically reciprocable impaling means mounted on said rotatable support, said impaling means being movable downwardly through corresponding holes in said rotatable support and being movable with their rotatable support in a circular path passing over said turntable, means for urging said impaling means resiliently in an upward direction, a third cam for urging said impaling means downwardly through the holes in said rotatable support as each said impaling means passes over said turntable, means for rotating said turntable and said rotatable support in synchronism, whereby, as said turntable moves said shaped products on said pistons from beneath said hopper to the level of said turntable and into a position below the path of said impaling means, a corresponding impaling means will descend and impale each shaped product and slide the same from said turntable, and means responsive to the continued rotation of said rotatable support for elevating said impaling means upwardly through the holes in said rotatable support for releasing said shaped product from said impaling means.

References Cited in the file of this patent

UNITED STATES PATENTS

| | | |
|---|---|---|
| 2,475,463 | Santo | July 5, 1949 |
| 2,491,179 | Holly | Dec. 13, 1949 |
| 2,553,823 | Holly | May 22, 1951 |
| 2,581,562 | Smith | Jan. 8, 1952 |
| 2,651,430 | Garfunkel | Sept. 8, 1953 |
| 2,767,884 | Gross | Oct. 23, 1956 |
| 2,770,202 | Garfunkel | Nov. 13, 1956 |
| 2,799,044 | Mahan | July 16, 1957 |
| 2,803,458 | Holly | Aug. 20, 1957 |
| 2,810,155 | Spang | Oct. 22, 1957 |
| 2,811,743 | Crabtree | Nov. 5, 1957 |